United States Patent
Mizuno et al.

(10) Patent No.: US 6,881,770 B2
(45) Date of Patent: Apr. 19, 2005

(54) RUBBER COMPOSITION FOR TIRE AND PNEUMATIC TIRE

(75) Inventors: Yoichi Mizuno, Kobe (JP); Masato Kawase, Kobe (JP); Takao Wada, Kobe (JP); Kazuo Hochi, Kobe (JP); Ritsuo Nakayasu, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 425 days.

(21) Appl. No.: 09/911,734

(22) Filed: Jul. 25, 2001

(65) Prior Publication Data

US 2002/0037950 A1 Mar. 28, 2002

(30) Foreign Application Priority Data

| Jul. 26, 2000 | (JP) | ............................. 2000-224798 |
| Feb. 5, 2001 | (JP) | ............................. 2001-028711 |
| Feb. 26, 2001 | (JP) | ............................. 2001-050247 |

(51) Int. Cl.$^7$ .............................................. C08K 3/34
(52) U.S. Cl. .................. 524/13; 523/215; 523/216; 524/35; 524/492; 524/493; 524/495; 524/496
(58) Field of Search ................ 524/13, 35, 492, 524/493, 495, 496; 523/215, 216

(56) References Cited

U.S. PATENT DOCUMENTS

| 3,697,364 A | * | 10/1972 | Boustany et al. ........... 428/107 |
| 4,125,493 A | * | 11/1978 | Posiviata et al. ............ 524/35 |
| 5,049,598 A | * | 9/1991 | Saito et al. ................... 524/13 |
| 5,569,697 A | * | 10/1996 | Ferrandino et al. ......... 524/492 |
| 5,672,639 A | * | 9/1997 | Corvasce et al. ............. 524/52 |

FOREIGN PATENT DOCUMENTS

| EP | 0 905 186 A1 | 3/1999 |
| EP | 0 942 041 A1 | 9/1999 |
| JP | 56008454 A | 1/1981 |
| JP | B25743575 | 9/1982 |
| JP | 62-104851 | 5/1987 |
| JP | 2167353 | 6/1990 |
| JP | 11-217466 | 8/1999 |
| JP | A11217466 | 8/1999 |

OTHER PUBLICATIONS

"Handbook of Fillers for Plastics", Katz ed. (1987).*
Cabot Brochure (1989).*

* cited by examiner

Primary Examiner—Edward J. Cain
(74) Attorney, Agent, or Firm—Birch, Stewart, Kolasch & Birch, LLP

(57) ABSTRACT

A rubber composition for tire and a pneumatic tire in which the rubber composition is used improve steering performance on snowy and icy roads as well as traction performance in the forward and backward directions while reducing the recycling and manufacturing cost. The rubber composition for tire contains from 0.5 to 12 parts by weight of paper relative to 100 parts by weight of a rubber component, and preferably further contains from 5 to 100 parts by weight of silica and from 2 to 15 parts by weight of short fiber relative to 100 parts by weight of the rubber component. The paper is newspaper waste. From 10 to 100 parts by weight of carbon black may further be contained relative to 100 parts by weight of the rubber component.

6 Claims, 1 Drawing Sheet

RUBBER COMPOSITION FOR TIRE AND PNEUMATIC TIRE

BACKGROUND OF THE INVENTION

1. Field of the Invention

The present invention relates to a rubber composition for use in tires that improves cornering performance on snowy and icy roads and braking performance in the to-and-fro direction with reduced manufacturing cost, and more specifically relates to a pneumatic tire employing such a rubber composition.

2. Description of the Background Art

Use of studded tires is legally prohibited for the purpose of preventing dust pollution caused by the studded tires. Then, in place of the studded tires, studless tires have recently been used in cold climates. Technical development in the last few years achieves the braking performance of studless tires that is close to the braking performance of studded tires. One of the factors affecting the braking performance of studless tires is frictional force between the tread rubber of a tire and a road surface. The frictional force includes adhesive friction, digging friction and hysteresis friction.

It has been tried to enhance the adhesive friction of a rubber composition for tires in order to improve the braking performance of the tires. For example, the rubber composition is made softer to increase the area of contact between the tire and a road surface. In order to soften the rubber composition, the amount of a filler to be added to the rubber is decreased, any rubber component which is less prone to become hard at low temperatures, polybutadiene rubber or polyisoprene rubber for example is used, or a softener is further added. However, tires employing such a softener rubber composition deteriorate in terms of steering stability and abrasion resistance. Therefore, the rubber composition cannot be made too soft.

It has alternatively been proposed to replace a part of carbon black in a rubber composition with silica and silane coupling agent to decrease the modulus at low temperatures and thus enhance the adhesive frictional force. This method dramatically improves wet grip performance, ice grip performance and cornering performance in the lateral direction. However, the braking performance in the to-and-fro direction is insufficient.

In recent years, there has been fierce competition between tire manufactures to reduce the cost. With the demand for reduction in manufacture cost of tires and rubber composition for tires, a demand for recycle has been growing.

For example, it is known to blend, in order to reduce the cost, a tire rubber composition for use in manufacture of tires with an organic or inorganic fiber which is cut into short pieces. Blending of the organic or inorganic fiber can improve the elastic modulus and tear strength of the rubber composition and further decrease the amount of rubber used in a tire product. Accordingly, resource saving and weight saving are effectively achieved. However, the fiber material used in the rubber composition is usually produced by fiber manufactures by cutting a fiber which is newly spun for the purpose of short fiber reinforcement. Then, the manufactured rubber composition is likely to become costly.

It is also known to blend a tire rubber composition with an inorganic reinforcing agent such as calcium carbonate, mica, clay and the like. These inorganic reinforcing agents are relatively cheap so that the manufacture cost of tires can be reduced. However, depending on the amount of the blended inorganic reinforcing agent, the resultant tires could be deteriorated in performance. Moreover, depending on the blended amount, the specific gravity becomes greater and reduction of cost per volume might not be expected.

In addition, in terms of recycling of raw materials, reclaimed rubbers are under study. However, the studies on reclaimed rubbers have not achieved an effective reduction in the cost of manufacturing tires. Moreover, a technique for blending resin or the like with used paper is disclosed as a method of recycling the used paper. For example, Japanese Patent Publication No. 57-43575 discloses a composite produced by blending thermoplastic resin and synthetic rubber or natural rubber with stearic acid as a lubricant, fusing the blended materials, and kneading chopped pieces of used paper with the fused product in the liquid phase.

Japanese Patent Laying-Open No. 11-217466 proposes a method of manufacturing a rubber reinforced by used paper, the reinforced rubber manufactured by melting the used paper in an alkaline solution in advance, blending the used paper with a rubber latex, and thereafter coagulating the rubber.

These techniques are complex regarding the process of manufacturing a rubber composition and have not achieved an effective reduction of manufacture cost. In particular, it has not been possible to obtain a rubber composition for use in tires that improves cornering performance on snowy and icy roads and braking performance in the forward and backward directions with manufacture cost reduced.

SUMMARY OF THE INVENTION

The present invention has been made to solve the problems above, providing a rubber composition for tire and a pneumatic tire using the rubber composition, achieving a remarkable reduction in the cost of manufacturing tire through an effective recycling of used paper by employing the used paper for reinforcing the tire rubber composition in terms of resource saving and environmental protection and further achieving improvement in cornering performance on snowy and icy roads and braking performance in the forward and backward directions without deteriorating basic characteristics of a manufactured tire such as hardness, dynamic modulus of elasticity, abrasion resistance and the like.

The present invention according to one aspect is a rubber composition for tire including from 0.5 to 12 parts by weight of paper relative to 100 parts by weight of a rubber component. The paper is preferably newspaper waste. The rubber composition for tire may include from 10 to 100 parts by weight of carbon black relative to 100 parts by weight of the rubber component. Preferably, the rubber composition for tire is used in a tread portion and/or a bead apex of a pneumatic tire.

According to another aspect of the invention, a rubber composition for tire includes from 0.5 to 12 parts by weight of paper and from 5 to 100 parts by weight of silica relative to 100 parts by weight of a rubber component. Preferably, the rubber composition further includes from 10 to 100 parts by weight of carbon black relative to 100 parts by weight of the rubber component. The rubber composition more preferably includes silane coupling agent.

According to still another aspect of the invention, a rubber composition for tire includes from 0.5 to 12 parts by weight of paper, from 5 to 100 parts by weight of silica and from 2 to 15 parts by weight of short fiber relative to 100 parts by weight of a rubber component. Preferably, the rubber composition for tire includes a powder product containing a cellulose material. The rubber composition for tire is preferably used in a tread portion and/or a bead apex of a pneumatic tire.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
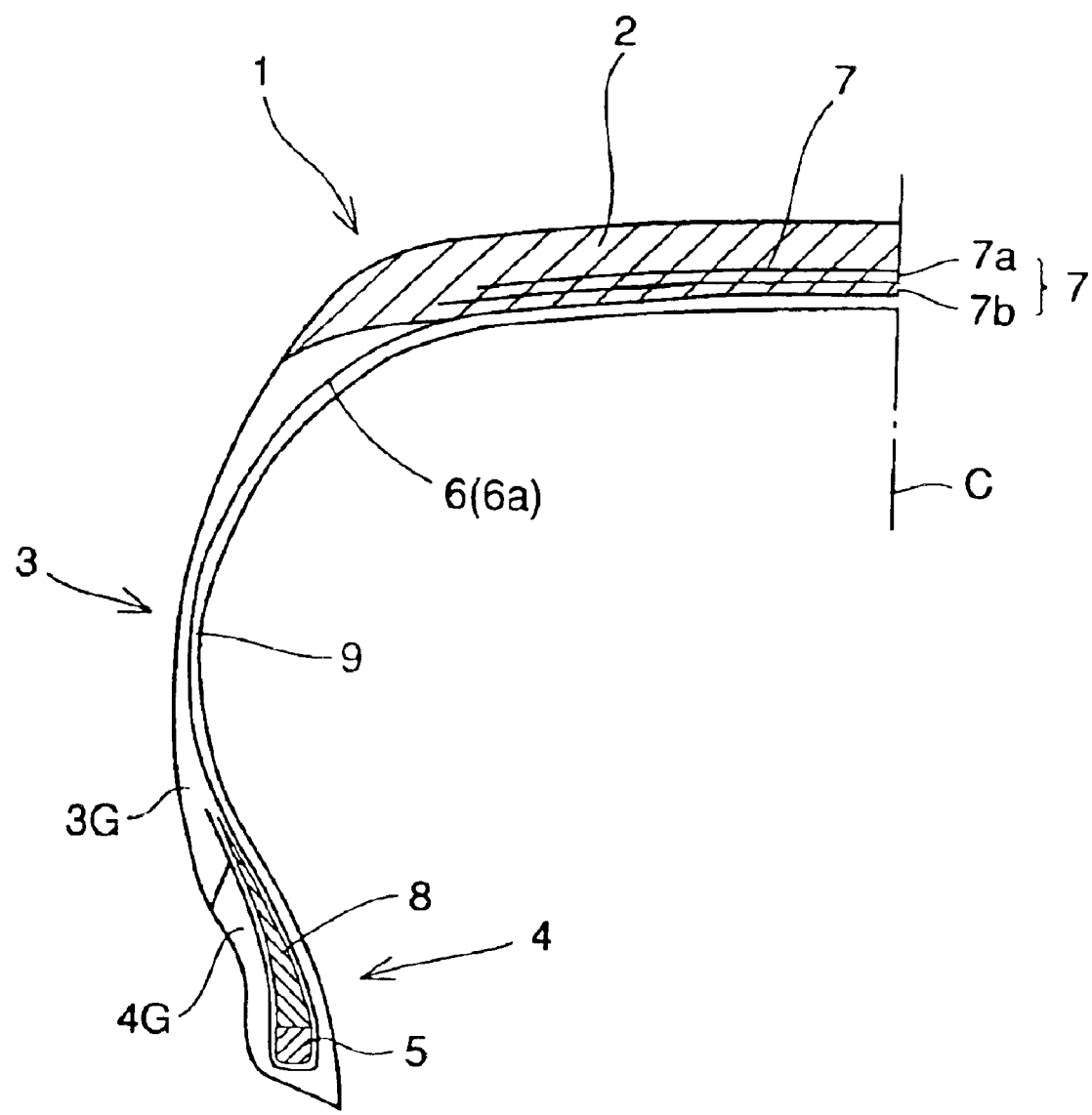
FIG. 1 is a left half cross section of a pneumatic tire according to the present invention.

A rubber composition for tire according to the present invention includes from 0.5 to 12 parts by weight of paper compounded relative to 100 parts by weight of a rubber component.

The rubber component here is not specifically limited to any particular rubber, and natural rubber (NR) and/or synthetic diene rubber are/is chiefly used. As the synthetic diene rubber, styrene-butadiene rubber (SBR), polybutadiene rubber (NR), polyisoprene rubber (IR), ethylene-propylene-diene rubber (EPDM), chloroprene rubber (CR), acrylonitrile-butadiene rubber (NBR), butyl rubber (IIR) and the like can be used. At least one or two of these rubbers can be contained in the rubber component employed by the present invention.

The ethylene-propylene-diene rubber (EPDM) contains ethylene-propylene rubber (EPM) and termonomer. The termonomer here is non-conjugated diene having the carbon number of 5 to 20, and examples thereof are 1,4-pentadiene, 1,4-hexadiene, 1,5-hexadiene, 2,5-dimethyl-1,5-hexadiene and 1,4-octadiene, cyclic diene such as 1,4-cyclohexadiene, cyclooctadiene, dicyclopentadiene and the like for example, and alkenyl norbornene such as 5-ethylidene-2-norbornene, 5-butylidene-2-norbornene, 2-methallyl-5-norbornene and 2-isopropenyl-5-norbornene for example. Among these diene materials, particularly the dicyclopentadiene, 5-ethylidene-2-norbornene and the like can preferably be used.

The paper serving as a reinforcing agent employed according to the present invention is newspaper waste, used copy paper, used cardboard or the like. The newspaper waste is particularly preferable since resultant tire compositions have uniform physical properties.

The paper to be compounded in the rubber composition is preferably cut into pieces having a width of 5 mm or less, preferably 3 mm, and a length of 100 mm or less, preferably 30 to 70 mm. The paper can be cut by any cutting machine such as a shredder. Before cutting, a dehydration process can be performed for dehydration of the paper. Further, it is possible to beat the paper by a beater into a muddy state of a low concentration containing 3% or lower of a solid component, blend a binder therewith such as adhesive and modifier as required, dehydrate the resultant paper by means of a filter press or the like, extrude the dehydrated paper by an extruder into ribbon-shaped pieces, further cut them into chip-shaped pieces of several tens of millimeters in length, and then mix the resultant paper pieces with the rubber composition.

From 0.5 to 12 parts by weight of paper are compounded per 100 parts by weight of a rubber component. If less than 0.5 parts by weight of paper are compounded, the effect of compounding is small. If more than 12 parts by weight of paper are compounded, the hardness and modulus of a resultant rubber composition are high. When such a rubber composition is used in a tire, basic characteristics of the tire may not be satisfactory.

According to the present invention, from 5 to 100 parts by weight of silica are compounded per 100 parts by weight of a rubber component. The silica employed by the present invention can be any which is usually applied to general-purpose rubber. Examples of the silica are dry silica wet silica, colloidal silica and the like used as a reinforcing agent. The wet white carbon is particularly preferable that contains hydrated silica as a main component.

Compounding of paper or paper waste with a rubber composition has a tendency to reduce the abrasion resistance. According to the present invention, the paper and silica can be used together to improve the abrasion resistance as well as hardness, cornering and braking characteristics of a tire employing the rubber composition. If less than 5 parts by weight of silica are compounded, a reinforcing effect is insufficient and characteristics such as abrasion resistance and the like cannot fully be improved. On the other hand, if more than 100 parts by weight of silica are compounded, an unvulcanized rubber composition has an increased viscosity which results in a deteriorated processability. More preferably, from 5 to 60 parts by weight of silica are compounded.

In order to improve the various characteristics as described above, silica preferably has a specific surface area by nitrogen adsorption (BET (Brunauer-Emmett and Teller's adsorption) method) that is usually 50 to 350 $m^2/g$, preferably 100 to 280 $m^2/g$ and more preferably 110 to 250 $m^2/g$. If the specific surface area is smaller than 50 $m^2/g$, the reinforcing effect is poor and the abrasion resistance decreases. If the specific surface area exceeds 350 $m^2/g$, a resultant rubber composition has a deteriorated processability, leading to a deteriorated braking performance. Here, the specific surface area by nitrogen adsorption is measured by the BET method in accordance with ASTM D3037-81.

The silica is commercially available for example as Nipsil VN3 and Nipsil AQ manufactured by Nippon Silica Industrial Co., Ltd., Z1165MP and Z1652Gr manufactured by Rhone-Poulenc, Ultrasil VN3 manufactured by Degussa AG, and the like.

The rubber composition according to the present invention contains from 0.1 to 10 parts by weight, preferably from 0.5 to 5 parts by weight of a silane coupling agent, preferably sulfur-containing silane coupling agent. Examples of the sulfur-containing silane coupling agent that can be used are 3-trimethoxysilylpropyl-N,N-dimethylthiocarbamoil-tetrasulfide, trimethoxysilylpropyl-mercapto-benzothiazole tetrasulfide, triethoxysilylpropyl-methacrylate-monosulfide, dimethoxymethylsilylpropyl-N,N-dimethylthiocarbamoil-tetrasulfide, bis-[3-(triethoxysilyl)-propyl] tetrasulfide, 3-mercaptopropyl trimethoxysilane and the like.

Other examples of the silane coupling agent that can be used are vinyl trichlorosilane, vinyl tris (2-methoxy ethoxy) silane, γ-glycidoxypropyltrimethoxysilane, γ-methacryloxypropyltrimethoxysilane, γ-(2-aminoethyl) aminopropyltrimethoxysilane, γ-chloropropyltrimethoxysilane, γ-aminopropyltriethoxysilane and the like.

Compounding of the silane coupling agent further improves the abrasion resistance and braking performance.

If less than 0.5 parts by weight of silane coupling agent are compounded, the above effect cannot be achieved. On the other hand, if more than 10 parts by weight of silane coupling agent are compounded, burning (scorching) is likely to occur in kneading and extrusion processes of rubber which is not preferable.

According to the present invention, other coupling agents, for example, aluminate type coupling agent or titanate type coupling agent may be used or used together with the silane coupling agent depending on applications. An example of the aluminate type coupling agent is acetoalkoxy aluminum di-isopropylate. Examples of the titanate type coupling agent that can be used are isopropyl triisostearoyl titanate, isopropyl tridecyl benzene sulfonyl titanate, isopropyl tris (dioctyl pyrophosphate) titanate and the like.

According to the present invention, the rubber composition for tire may contain a white filler besides silica. An increased amount of white filler contained in a rubber composition for tire has a tendency to deteriorate various physical properties of the tire rubber composition. However, the present invention adds paper to allow the white filler to be used in combination with silica. Examples of the white filler are clay, alumina, talc, calcium carbonate, magnesium carbonate, aluminum hydroxide, magnesium hydroxide, magnesium oxide, titanium oxide and the like, and one or at least two of these materials can be mixed for use.

Preferably, carbon black is used in combination with silica as a filler according to the present invention. From 10 to 100 parts by weight of carbon black relative to 100 parts by weight of a rubber component are compounded. If the carbon black is used in combination with silica, the compounded carbon black is 0.1 to 10.0 times as much as the amount of compounded silica. The carbon black preferably has physical properties that the specific surface area by nitrogen adsorption (BET method) is from 40 to 160 m$^2$/g, the DBP oil absorption is from 70 to 130 ml/100 g, and iodine adsorption value is from 70 to 130 mg/g. The carbon black having these physical properties can be compounded together with paper and silica to synergistically enhance the reinforcing effect.

Preferably, short fiber is compounded with the rubber composition according to the present invention. The short fiber is compounded with the rubber composition and oriented in an extrusion process.

According to Japanese Patent Laying-Open No. 2000-168315, it is proposed to orient short fibers in the direction perpendicular to the tread plane to improve digging friction. When the rubber composition of the present invention is used to form a tread of a studless tire, preferably short fibers are oriented in the circumferential direction of the tire for example.

Some short fibers oriented in the circumferential direction of the tire drop off during running to generate fine slits (microscopic long and thin grooves) in the tread block surface. The generated slits where the dropped short fibers were present can remove a water film (draining effect), enhance friction on ice by edge effect and thus remarkably improve ice grip performance of the studless tire.

From 2 to 15 parts by weight, preferably from 3 to 15 parts by weight of short fiber are contained relative to 100 parts by weight of the rubber component. If less than 2 parts by weight of short fiber are contained, the objective, i.e., water film removal effect is unsatisfactory. On the other hand, more than 15 parts by weight of short fiber that are contained do not provide a remarkable reinforcing effect, adversely affect the abrasion resistance, cause the tread surface to readily become rough after running, and reduce the area of contact between the rubber itself and an icy surface, resulting in deterioration in tackiness effect (ice grip performance). Further, in terms of the balance between the reinforcing effect and the ice grip performance, particularly from 5 to 10 parts by weight of short fiber are preferably contained.

Examples of the short fiber that can be employed by the present invention are glass fiber, aluminum whisker, polyester fiber, nylon fiber, polyvinyl formal fiber, aromatic polyamide fiber and the like. In particular, inorganic type short fiber of at least 2.0 in specific gravity like the glass fiber, aluminum whisker and the like are preferred in view of dispersion in the kneading process, optimum shaping by the kneading, and orientation.

The short fiber preferably has a diameter of 5 to 100 μm and more preferably has that of 20 to 80 μm. If the diameter of short fiber is smaller than 5 μm, the slits or holes (microscopic long and thin grooves) generated after short fibers drop off therefrom are too small in size and accordingly the objective effect of removing a water film between the tread rubber and a road surface cannot fully be exhibited. The diameter of short fiber exceeding 100 μm provides an insufficient reinforcing effect, adversely affects the abrasion resistance, causes the tread surface to readily become rough after running, and reduces the area of contact between the rubber itself and an icy surface, resulting in deterioration in tackiness effect (ice grip performance). Further, in terms of the balance between the reinforcing effect and the ice grip performance, particularly the short fiber preferably has a diameter of 35 to 65 μm.

The length of short fiber is preferably from 0.2 to 5.0 mm and more preferably from 1.4 to 2.6 mm. If the length of short fiber is smaller than 0.2 mm, it is likely that the effect of removing a water film between the tread rubber and a road surface cannot sufficiently be achieved. The length exceeding 5.0 mm has a tendency to reduce the tackiness effect.

Preferably, according to the present invention, the rubber composition for tire includes powder product containing a cellulose material.

The content of powder product containing the cellulose material is preferably from 3 to 15 parts by weight and particularly from 5 to 10 parts by weight relative to 100 parts by weight of the rubber component. If the content of powder product is less than 3 parts by weight, it is likely that the objective spike effect cannot fully be exhibited. On the other hand, if the content of powder product exceeds 15 parts by weight, the rubber itself has a higher hardness and the powder product itself contacts a road surface. As a result, the area of contact between the base rubber itself and an icy surface decreases and thus the tackiness effect is likely to decrease. Further, it is likely that a sufficient abrasion resistance cannot be achieved.

The cellulose material in the powder product employed by the present invention is the same as the cellulose material disclosed in Japanese Patent Laying-Open No. 2-167353, namely refers to rice chaff, wheat chaff, cork piece, sawdust and the like. The powder product may contain silica, clay, lignin, fatty acid, moisture and the like except for the cellulose material. Preferably from 20 to 40%, particularly from 25 to 35% by weight of the cellulose material is contained in the powder product. If the content of the cellulose material is less than 20% by weight, the dispersion in the kneading process is likely to be deteriorated. If the content thereof exceeds 40% by weight, the hardness becomes lower to cause the spike effect to decrease.

The cellulose material contained in the powder product as one component promotes the solubility of the powder product with the rubber. In other words, the powder product is readily dispersed in the kneading process. Further, a weak bonding between the powder product and the rubber is generated. Although the powder product readily drops off as the tire wears during running, the powder product allows the tear strength not to decrease considerably. For example, a cracking of grooves is unlikely to occur.

Moreover, the cellulose material does not cause problems of abrasion of a pavement and deterioration in the tackiness effect between the rubber and a frozen road surface due to an increased hardness of the rubber itself, compared with a high-hardness material such as metal contained in the powder product. On the other hand, any material having a lower hardness than the cellulose material cannot provide a satisfactory spike effect. In view of this, the above-mentioned rice chaff, wheat chaff, cork piece, sawdust and the like that are crushed pieces of plants have the optimum hardness. In particular, the rice chaff has the optimum hardness. Chaff, which is a natural product, is powder having an uneven surface and has features that it is readily soluble with the rubber and it allows the tear strength and resistance to cracking of grooves to deteriorate to a smaller degree.

The powder product has an average grain size which is preferably from 20 to 600 $\mu$m and more preferably from 100 to 200 $\mu$m. If the average grain size of the powder product is smaller than 20 $\mu$m, it is likely that the objective spike effect cannot fully be achieved. If the average grain size exceeds 600 $\mu$m, the reinforcing effect is insufficient and the abrasion resistance is adversely affected. Further, the tread surface becomes readily rough after running and the area of contact between the rubber itself and an icy surface decreases. Thus, the tackiness effect is likely to decrease. Further, in terms of the balance between the reinforcing effect and the ice grip performance, particularly the average grain size is preferably from 100 to 120 $\mu$m.

To the rubber composition for tire according to the present invention, vulcanizing agent, vulcanization accelerator, softener, plasticizer, antioxidant, blowing agent, antiscorching agent and the like may be added in addition to those compounding ingredients described above.

As the vulcanizing agent, organic peroxide or sulfur-based vulcanizing agent may be used. Examples of the organic peroxide that can be employed are benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butyl peroxy)hexane, 2,5-dimethyl-2,5-di(benzoyl peroxy)hexane, 2,5-dimethyl-2,5-di(t-butyl peroxy)hexyne-3 or 1,3-bis(t-butyl peroxy propyl)benzene, di-t-butyl peroxy-diisopropyl benzene, t-butyl peroxy benzene, 2,4-dichlorobenzoyl peroxide, 1,1-di-t-butyl peroxy-3,3,5-trimethyl siloxane, n-butyl-4,4-di-t-butyl peroxyvalerate and the like. In particular, the dicumyl peroxide, t-butyl peroxy benzene and di-t-butyl peroxy-diisopropyl benzene are preferred. As the sulfur-based vulcanizing agent, sulfur and morpholine disulfide can be used and particularly the sulfur is preferred.

As the vulcanizing accelerator, any accelerator can be employed that contains at least one of sulfenamide type accelerator, thiazole type accelerator, thiuram type accelerator, thiourea type accelerator, guanidine type accelerator, dithiocarbamate type accelerator, aldehyde-amine type or aldehyde-ammonia type accelerator, imidazoline type accelerator and xanthate type accelerator.

Examples of the sulfenamide type accelerator are sulfenamide type compounds such as CBS (N-cyclohexyl-2-benzothiazyl sulfen amide), TBBS (N-ter-butyl-2-benzothiazyl sulfen amide), N,N-dicyclohexyl-2-benzothiazyl sulfen amide, N-oxydiethylene-2-benzothiazyl sulfen amide, N,N-diisopropyl-2-benzothiazole sulfen amide and the like.

Examples of the thiazole type accelerator are MBT (2-mercaptobenzothiazole), MBTS (dibenzothiazyl disulfide), sodium salt of 2-mercaptobenzothiazole, zinc salt of 2-mercaptobenzothiazole, copper salt of 2-mercaptobenzothiazole, cyclohexyl amine salt, 2-(2,4-dinitrophenyl) mercaptobenzothiazole, 2-(2,6-diethyl-4-morpholinothio)benzothiazole and the like.

Examples of the thiuram type accelerator are TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide and the like.

Examples of the thiourea type accelerator are thiourea compounds such as thiocarbamide, diethyl thiourea, dibutyl thiourea, trimethyl thiourea, diorthotolyl thiourea and the like.

Examples of the guanidine type accelerator are guanidine-based compounds such as diphenylguanidine, diorthotolyl guanidine, triphenylguanidine, orthotolylbiguanide, diphenylguanidine phthalate and the like.

Examples of the dithiocarbamate type accelerator are dithiocarbamate-based compounds such as zinc ethylphenyl dithiocarbamate, zinc butylphenyl dithiocarbamate, sodium dimethyl dithiocarbamate, zinc dimethyl dithiocarbamate, zinc diethyl dithiocarbamate, zinc dibutyl dithiocarbamate, zinc diamyl dithiocarbamate, zinc dipropyl dithiocarbamate, complex salt of zinc pentamethylene dithiocarbamate and piperidine, zinc hexadecyl (or octadecyl) isopropyl dithiocarbamate, zinc dibenzyl dithiocarbamate, sodium diethyl dithiocarbamate, piperidine pentamethylene dithiocarbamate, selemium dimethyl dithiocarbamate, tellurium diethyl dithiocarbamate, cadmium diamyl dithiocarbamate and the like.

Examples of aldehyde-amine type or aldehyde-ammonia type accelerator are reaction product of acetaldehyde and aniline, condensation product of butyraldehyde and aniline, hexamethylene tetramine, reaction product of acetaldehyde and ammonia and the like.

The antioxidant (degradation inhibitor) can appropriately be selected for use from amine type antioxidant, phenol type antioxidant, imidazole type antioxidant, metal salt of carbamate, wax and the like.

According to the present invention, softener can be used in combination with other ingredients in order to further enhance processability in kneading. Examples of the softener are petroleum softener such as process oil, lubricating oil, paraffin, liquid paraffin, petroleum asphalt, petrolatum and the like, fatty oil type softener such as castor oil, linseed oil, rape oil, coconut oil and the like, waxes such as tall oil, factice, beeswax, carnauba wax, lanoline and the like, linoleic acid, palmitic acid, stearic acid, lauric acid and the like.

Additionally, plasticizer may be used as required, such as DMP (dimethyl phthalate), DEP (diethyl phthalate), DBP (dibutyl phthalate), DHP (diheptyl phthalate), DOP (dioctyl phthalate), DINP (diisononyl phthalate), DIDP (diisodecyl phthalate), BBP (butyl benzyl phthalate), DLP (dilauryl phthalate), DCHP (dicyclohexyl phthalate), tetrahydrophthalic anhydride ester, DOZ (azelic acid di-2-ethylhexyl), DBS (dibutyl sebacate), DOS (dioctyl sebacate), acetyl triethyl citrate, acetyl tributyl citrate, DBM (dibutyl maleate), DOM (maleate-2-ethylhexyl), DBF (dibutyl fumarate) and the like.

According to the present invention, antiscorching agent may be used for preventing or retarding scorching, for example, organic acid such as phthalic anhydride, salicylic acid and benzoic acid, nitroso compound such as N-nitroso diphenylamine, N-cyclohexyl thiophthalimide and the like.

The rubber composition according to the present invention is preferably used in the tread portion of a tire. An embodiment of the present invention is now described in conjunction with the drawing. FIG. 1 shows the left half of a cross section of a pneumatic radial tire for use with a passenger car according to the present invention. Tire 1 includes a tread portion 2, a pair of sidewall portions 3 extending from respective ends of the tread portion 2 inwardly in the radial direction of tire 1, and bead portions 4 each located at the inner end of sidewall portion 3. A carcass 6 is provided to extend between bead portions 4, 4, and a belt layer 7 having hoop effect is further provided in the radial direction outside carcass 6.

Carcass 6 is formed of at least one carcass ply 6a having a carcass cord arranged at an angle of 70–90° relative to tire equator C, for example. Carcass ply 6a extends from tread portion 2 to a bead core 5 of bead portion 4 through side wall portion 3 and further extends around bead core 5 where carcass ply 6a is folded back from the inside to the outside relative to the direction of the tire axis to be secured accordingly.

Belt layer 7 is formed of at least two belt plies 7a and 7b having belt cords arranged at an angle of 45° or smaller relative to tire equator C, for example. Belt plies are stacked on each other so that belt cords embedded in the belt plies cross in different directions from each other. A band layer (not shown) may further be provided outside belt layer 7. In this case, the band layer is formed of a continuous ply having an organic fiber cord of low modulus wound in a spiral manner almost in parallel with tire equator C.

Further, a bead apex rubber 8 is arranged to extend from bead core 5 outwardly in the radial direction. An inner liner rubber 9 is provided adjacent to the inside of carcass 6 to form a tire inner surface. The outside of carcass 6 is protected by a chafer rubber 4G and a sidewall rubber 3G.

The rubber composition for tire according to the present invention is used in tread portion 2 or bead apex rubber 8 of pneumatic tire 1 to exhibit excellent cornering performance, braking performance and abrasion resistance. The pneumatic radial tire in which the rubber composition of the present invention is used is not limited in structure to the structure as detailed above.

EXAMPLES 1–5 AND COMPARATIVE EXAMPLES 1 AND 2

(1) Preparation of Rubber Composition

Rubber compositions were prepared according to the rubber recipe shown in Table 1.

TABLE 1

|  | Comparative Example | | Example | | | | |
|---|---|---|---|---|---|---|---|
|  | 1 | 2 | 1 | 2 | 3 | 4 | 5 |
| natural rubber | 80 | 80 | 80 | 80 | 80 | 80 | 80 |
| polybutadiene*1 rubber | 20 | 20 | 20 | 20 | 20 | 20 | 20 |
| carbon black 1*2 | 50 | 50 | 50 | 50 | 50 | 50 | 50 |
| stearic acid*3 | 2 | 2 | 2 | 2 | 2 | 2 | 2 |
| zinc oxide*4 | 5 | 5 | 5 | 5 | 5 | 5 | 5 |
| antioxidant*5 | 2 | 2 | 2 | 2 | 2 | 2 | 2 |
| wax*6 | 1.5 | 1.5 | 1.5 | 1.5 | 1.5 | 1.5 | 1.5 |
| newspaper waste*7 | 0 | 15 | 1 | 3 | 6 | 10 | 12 |
| process oil*8 | 5 | 5 | 5 | 5 | 5 | 5 | 5 |
| sulfur*9 | 1 | 1 | 1 | 1 | 1 | 1 | 1 |
| vulcanization*10 accelerator | 1.2 | 1.2 | 1.2 | 1.2 | 1.2 | 1.2 | 1.2 |
| hardness (Shore A) | 60.8 | 72.9 | 61.3 | 63.0 | 65.7 | 68.0 | 71.0 |
| elastic modulus E* (MPa) | 4.20 | 8.29 | 4.50 | 5.70 | 6.90 | 7.70 | 8.10 |
| loss tangent (tan δ) | 0.125 | 0.135 | 0.122 | 0.122 | 0.122 | 0.128 | 0.133 |
| modulus M100 (MPa) | 1.7 | 4.3 | 1.8 | 2.3 | 2.7 | 3.6 | 4.0 |
| modulus M200 (MPa) | 5.2 | 9.4 | 5.2 | 5.6 | 6.0 | 7.4 | 9.0 |
| modulus M300 (MPa) | 9.9 | 17.9 | 10.1 | 10.4 | 11.0 | 13.4 | 17.0 |
| abrasion index | 100 | 62 | 96 | 89 | 85 | 80 | 73 |

Details of rubber components and compounding ingredients are as follows.

*1) polybutadiene rubber (BR): BR 150B from Ube Industries, Ltd.

*2) carbon black 1: Diablack I (N220) from Mitsubishi Chemical Corporation, with specific surface area by nitrogen adsorption of 115 m$^2$/g, DBP absorption of 114 ml/100 g and iodine adsorption value of 118 m$^2$/g

*3) stearic acid: Kiri from NOF Corporation

*4) zinc oxide: Ginrei R from Toho Zinc Co., Ltd.

*5) antioxidant: Ozonon 6C from Seiko Chemical Co., Ltd.

*6) wax: Sunnoc Wax from Ouchishinko Chemical Industrial Co., Ltd.

*7) newspaper waste: common old newspaper used by being cut by means of Shredder MC 12 manufactured by Fuji Xerox into pieces of approximately 3 mm in width and 45 mm in length

*8) process oil: Diana Process AH40 from Idemitsu Kosan Co., Ltd.

*9) sulfur: sulfur from Tsurumi Chemical Industry Co., Ltd.

*10) vulcanization accelerator: Nocceler NS (N-ter-butyl-2-benzothiazolylsulfenamide) from Ouchishinko Chemical Industrial Co., Ltd.

The rubber composition thus prepared was used to form a sheet of approximately 2 mm in gauge, which is vulcanized at approximately 175° C. with 25 kgf for 14 minutes to prepare a test sample.

Physical properties were evaluated by the methods described below.

<Hardness (Shore A)>

The hardness was measured at 25° C. by using a hardness tester according to ISO-7619.

<Viscoelasticity Test>

A test sample from the rubber composition was used to measure elastic modulus E* and loss tangent (tan δ) by means of a viscoelasticity spectrometer manufactured by Iwamoto Seisakusho, under the conditions that frequency was 10 kHz, dynamic strain was 1% and temperature was 60° C. A greater elastic modulus E* means that the stiffness is higher and a lower loss tangent (tan δ) means that the heat build-up property is lower and thus a better performance and a better rolling resistance are exhibited.

<Tensile Test>

A tensile test was conducted for a test sample by means of a #3 dumbbell according to JIS-K6251 to measure 100% modulus (M100 (MPa)), 200% modulus (M200 (MPa)) and 300% modulus (M300 (MPa)). A greater modulus value means that the stiffness is higher.

<Wear Test>

A test sample produced from the prepared rubber composition was used to measure abrasion thereof by means of a Lambourn abrasion tester manufactured by Iwamoto Seisakusho, under the conditions that the surface rotating speed was 50 m/min, the load was 1.5 kg, the amount of dropped sand was 15 g/min, the slip ratio was 20% and the measurement time was 3 minutes. Results of the wear test were evaluated relatively by defining the value of Comparative Example 1 described below as 100. A greater abrasion index means that the abrasion resistance is excellent.

Example 1

A rubber composition according to Example 1 had Shore A hardness of 61.3, elastic modulus E* of 4.50 (MPa), loss tangent (tan δ) of 0.122, M100 of 1.8 (MPa), M200 of 5.2 (MPa), M300 of 10.1 (MPa), and abrasion index of 96 relative to the value 100 of Comparative Example 1 discussed below.

Example 2

The quantitative makeup of a rubber composition for tire was similar to that of Example 1 except that the amount of compounded old newspaper was 3 parts by weight. Additionally, the rubber composition was manufactured and tested by similar methods to those for Example 1.

The rubber composition according to Example 2 had Shore A hardness of 63.0, elastic modulus E* of 5.70 (MPa), loss tangent (tan δ) of 0.122, M100 of 2.3 (MPa), M200 of 5.6 (MPa), M300 of 10.4 (MPa), and abrasion index of 89 relative to the value 100 of Comparative Example 1 discussed below.

Example 3

The quantitative makeup of a rubber composition for tire was similar to that of Example 1 except that the amount of compounded old newspaper was 6 parts by weight. The rubber composition was manufactured and tested by similar methods to those for Example 1.

The rubber composition according to Example 3 had Shore A hardness of 65.7, elastic modulus E* of 6.90 (MPa), loss tangent (tan δ) of 0.122, M100 of 2.7 (MPa), M200 of 6.0 (MPa), M300 of 11.0 (MPa), and abrasion index of 85 relative to the value 100 of Comparative Example 1 discussed below.

Example 4

The quantitative makeup of a rubber composition for tire was similar to that of Example 1 except that the amount of compounded old newspaper was 10 parts by weight. The rubber composition was manufactured and tested by similar methods to those for Example 1.

The rubber composition according to Example 4 had Shore A hardness of 68.0, elastic modulus E* of 7.70 (MPa), loss tangent (tan δ) of 0.128, M100 of 3.6 (MPa), M200 of 7.4 (MPa), M300 of 13.4 (MPa), and abrasion index of 80 relative to the value 100 of Comparative Example 1 discussed below.

Example 5

The quantitative makeup of a rubber composition for tire was similar to that of Example 1 except that the amount of compounded old newspaper was 12 parts by weight. The rubber composition was manufactured and tested by similar methods to those for Example 1.

The rubber composition according to Example 5 had Shore A hardness of 71.0, elastic modulus E* of 8.10 (MPa), loss tangent (tan δ) of 0.133, M100 of 4.0 (MPa), M200 of 9.0 (MPa), M300 of 17.0 (MPa), and abrasion index of 73 relative to the value 100 of Comparative Example 1 discussed below.

Comparative Example 1

The quantitative makeup of a rubber composition for tire was similar to that of Example 1 discussed above except that no old newspaper was compounded. The rubber composition was manufactured and tested by similar methods to those for Example 1.

The rubber composition according to Comparative Example 1 had Shore A hardness of 60.8, elastic modulus E* of 4.20 (MPa), loss tangent (tan δ) of 0.125, M100 of 1.7 (MPa), M200 of 5.2 (MPa), M300 of 9.9 (MPa), and abrasion index was defined as 100 to make a relative evaluation for Comparative Example 2 and Examples 1–5.

Comparative Example 2

The quantitative makeup of a rubber composition for tire was similar to that of Example 1 except that the amount of compounded old newspaper was 15 parts by weight. The rubber composition was manufactured and tested by similar methods to those for Example 1.

The rubber composition according to Comparative Example 2 had Shore A hardness of 72.9, elastic modulus E* of 8.29 (MPa), loss tangent (tan δ) of 0.135, M100 of 4.3 (MPa), M200 of 9.4 (MPa), M300 of 17.9 (MPa), and abrasion index of 62 relative to the value 100 of Comparative Example 1 discussed below. Resultant measurements are shown in Table 1 above.

Examples 1 to 5 and Comparative Examples 1 and 2 provide rubber compositions used in the tread of a pneumatic tire. It is seen from Table 1 that the old newspaper can be compounded with the rubber composition to enhance the hardness. Additionally, the elastic modulus E* and moduli can be increased and accordingly a higher stiffness can be achieved by blending the old newspaper. The loss tangent (tan δ) of the rubber composition with which old newspaper is compounded is almost equal to that of the rubber composition without old newspaper. The rubber composition with the old newspaper exhibits heat build-up property and rolling resistance almost similar to those of the rubber composition without old newspaper. The results of wear test show that compounding of old newspaper somewhat deteriorates abrasion resistance. In particular, the result of Comparative Example 2 shows that the amount of compounded newspaper greater than 12 parts by weight considerably deteriorates the abrasion resistance.

EXAMPLES 6–10 AND COMPARATIVE EXAMPLES 3 AND 4

(1) Preparation of Rubber Composition

Rubber compositions were prepared according to the rubber recipe shown in Table 2.

TABLE 2

|  | Comparative Example | | Example | | | | |
| --- | --- | --- | --- | --- | --- | --- | --- |
|  | 3 | 4 | 6 | 7 | 8 | 9 | 10 |
| natural rubber | 100 | 100 | 100 | 100 | 100 | 100 | 100 |
| carbon black 2*1 | 70 | 70 | 70 | 70 | 70 | 70 | 70 |
| stearic acid*3 | 2 | 2 | 2 | 2 | 2 | 2 | 2 |
| zinc oxide*4 | 4 | 4 | 4 | 4 | 4 | 4 | 4 |
| antioxidant*5 | 2 | 2 | 2 | 2 | 2 | 2 | 2 |
| newspaper waste*7 | — | 15 | 1 | 3 | 6 | 10 | 12 |
| process oil*8 | 5 | 5 | 5 | 5 | 5 | 5 | 5 |
| sulfur*9 | 1.5 | 1.5 | 1.5 | 1.5 | 1.5 | 1.5 | 1.5 |
| vulcanization*10 accelerator | 3 | 3 | 3 | 3 | 3 | 3 | 3 |
| hardness (Shore A) | 82.0 | 98.2 | 83.1 | 85.6 | 88.7 | 92.0 | 94.0 |
| elastic modulus E* (MPa) | 16.0 | 27.8 | 17.3 | 19.1 | 23.8 | 25.0 | 27.0 |
| loss tangent (tan δ) | 0.201 | 0.191 | 0.200 | 0.202 | 0.195 | 0.191 | 0.190 |
| modulus M100 (MPa) | 7 | 17 | 7 | 8 | 8 | 11 | 14 |
| modulus M200 (MPa) | 14 | 37 | 14 | 15 | 15 | 20 | 32 |
| modulus M300 (MPa) | — | — | — | — | — | — | — |
| adhesioness with ply | cf* | ip** | cf* | cf* | cf* | cf* | cf* |

*cf: cohesive failure
**ip: interfacial peeling

The compounding ingredients indicated by ※1) and ※3)–※10) in Table 2 were the same as those shown in Table 1 except for carbon black 2.

※1) carbon black 2: Seast N (N330) manufactured by Tokai Carbon Co., Ltd.

Ingredients as shown in Table 2 except for sulfur and vulcanization accelerator were blended and thereafter kneaded in a Banbury mixer at about 150° C. for 5 minutes. The sulfur and vulcanization accelerator were added to the resultant rubber composition, and it was further kneaded in a twin-screw open roll at about 80° C. for 5 minutes.

The resultant rubber composition was used to form a sheet of about 2 mm in gauge to be vulcanized at approximately 175° C. for 14 minutes with 25 kgf, and a test sample was prepared accordingly.

Hardness (Hs), viscoelasticity, tensile and wear tests were conducted by the methods as described above and an adhesion test was further performed as described below.

<Adhesion Test>

The adhesion test was used to examine the adhesioness with respect to a ply rubber which is a component adjacent to the bead apex. According to JIS K6256, a strip-shaped test sample was used to draw it at the rate of elongation of 50.0 mm/min for comparison of peeling state. The occurrence of cohesive failure means there is no problem in terms of the degree of adhesion and the interfacial peeling is not desirable in terms of durability. Ply refers to cords embedded in rubber, which constitutes a carcass of a tire.

Example 6

A rubber composition according to Example 6 had Shore A hardness of 83.1, elastic modulus E* of 17.3 (MPa), loss tangent (tan δ) of 0.200, M100 of 7 (MPa), and M200 of 14 (MPa), and exhibited cohesive failure as adhesiveness with respect to the ply.

Example 7

The quantitative makeup of a rubber composition for tire was similar to that of Example 6 described above except that the amount of compounded old newspaper was 3 parts by weight. The rubber composition was manufactured and tested by similar methods to those for Example 6.

The rubber composition according to Example 7 had Shore A hardness of 85.6, elastic modulus E* of 19.1 (MPa), loss tangent (tan δ) of 0.202, M100 of 8 (MPa), and M200 of 15 (MPa), and exhibited cohesive failure as adhesiveness with respect to the ply.

Example 8

The quantitative makeup of a rubber composition for tire was similar to that of Example 6 described above except that the amount of compounded old newspaper was 6 parts by weight. The rubber composition was manufactured and tested by similar methods to those for Example 6.

The rubber composition according to Example 8 had Shore A hardness of 88.7, elastic modulus E* of 23.8 (MPa), loss tangent (tan δ) of 0.195, M100 of 8 (MPa), and M200 of 15 (MPa), and exhibited cohesive failure as adhesiveness with respect to the ply.

Example 9

The quantitative makeup of a rubber composition for tire was similar to that of Example 6 described above except that the amount of compounded old newspaper was 10 parts by weight. The rubber composition was manufactured and tested by similar methods to those for Example 6.

The rubber composition according to Example 9 had Shore A hardness of 92.0, elastic modulus E* of 25.0 (MPa), loss tangent (tan δ) of 0.191, M100 of 11 (MPa), and M200 of 20 (MPa), and exhibited cohesive failure as adhesiveness with respect to the ply.

Example 10

The quantitative makeup of a rubber composition for tire was similar to that of Example 6 described above except that the amount of compounded old newspaper was 12 parts by weight. The rubber composition was manufactured and tested by similar methods to those for Example 6.

The rubber composition according to Example 10 had Shore A hardness of 94.0, elastic modulus E* of 27.0 (MPa), loss tangent (tan δ) of 0.190, M100 of 14 (MPa), and M200 of 32 (MPa), and exhibited cohesive failure as adhesiveness with respect to the ply.

Comparative Example 3

The quantitative makeup of a rubber composition for tire was similar to that of Example 6 described above except that no newspaper was compounded. The rubber composition was manufactured and tested by similar methods to those for Example 6.

The rubber composition according to Comparative Example 3 had Shore A hardness of 82.0, elastic modulus E* of 16.0 (MPa), loss tangent (tan δ) of 0.201, M100 of 7 (MPa), and M200 of 14 (MPa), and exhibited cohesive failure as adhesiveness with respect to the ply.

Comparative Example 4

The quantitative makeup of a rubber composition for tire was similar to that of Example 6 described above except that the amount of compounded old newspaper was 15 parts by weight. The rubber composition was manufactured and tested by similar methods to those for Example 6.

The rubber composition according to Comparative Example 4 had Shore A hardness of 98.2, elastic modulus E* of 27.8 (MPa), loss tangent (tan δ) of 0.191, M100 of 17 (MPa), and M200 of 37 (MPa), and exhibited interfacial peeling as adhesiveness with respect to the ply.

Examples 6 to 10 and Comparative Examples 3 and 4 provide rubber compositions used for the bead apex rubber of a pneumatic tire. It is seen from Table 2 that the old newspaper can be compounded with the rubber composition to enhance the hardness. Additionally, the elastic modulus E* and moduli can be increased and accordingly a higher stiffness can be achieved by blending the old newspaper. The loss tangent (tan δ) of Examples 6, 8, 9 and 10 can be made low, and accordingly it can be understood these examples have a tendency that the heat build-up property can relatively be kept low. The adhesion test with respect to the ply indicates that the amount of compounded old newspaper exceeding 12 parts by weight results in interfacial peeling.

EXAMPLES 11–16, EXAMPLES 19–30 AND COMPARATIVE EXAMPLES 5–12

(1) Basic Composition of Rubber

A rubber composition having the basic composition as shown in Table 3 was used.

TABLE 3

| compounding ingredient | PHR |
|---|---|
| NR (natural rubber) | 70 |
| BR (polybutadiene rubber) ✕1) | 30 |
| antioxidant ✕2) | 2 |
| wax ✕3) | 2 |
| stearic acid ✕4) | 2 |
| zinc oxide ✕5) | 5 |
| sulfur ✕6) | 1 |
| vulcanization accelerator ✕7) | 1.5 |
| carbon black ✕8) | varied |

TABLE 3-continued

| compounding ingredient | PHR |
|---|---|
| silica ✕9) | varied |
| silane coupling agent ✕10) | varied |
| newspaper (1) ✕11) | varied |
| newspaper (2) ✕12) | varied |
| process oil ✕13) | varied |

Details of the rubber components and compounding ingredients used here are as follows:

✕1) polybutadiene rubber (BR): BR 150B from Ube Industries, Ltd.

✕2) antioxidant: Ozonon 6C from Seiko Chemical Co., Ltd.

✕3) wax: Sunnoc Wax from Ouchishinko Chemical Industrial Co., Ltd.

✕4) stearic acid: Kiri from NOF Corporation

✕5) zinc oxide: Ginrei R from Toho Zinc Co., Ltd.

✕6) sulfur: sulfur from Tsurumi Chemical Industry Co., Ltd.

✕7) vulcanization accelerator: Nocceler NS (N-ter-butyl-2-benzothiazolylsulfenamide) from Ouchishinko Chemical Industrial Co., Ltd.

(2) Preparation of Rubber Composition

According to the basic composition mentioned above, rubber compositions were prepared with the amounts of silica, silane coupling agent, carbon black, newspapers and process oil varied respectively for Examples 11 to 16 and Comparative Examples 5 to 12 as shown in Table 4 and further for Examples 19 to 30 as shown in Table 5.

TABLE 4

| | Comparative Example | | | | | | Example | | | | | | CE* | |
|---|---|---|---|---|---|---|---|---|---|---|---|---|---|---|
| (PHR) | 5 | 6 | 7 | 8 | 9 | 10 | 11 | 12 | 13 | 14 | 15 | 16 | 11 | 12 |
| carbon black*8 | 50 | 40 | 30 | 20 | 10 | 0 | 50 | 50 | 50 | 50 | 50 | 50 | 50 | 30 |
| silica*9 | — | 10 | 20 | 30 | 40 | 50 | — | — | — | — | — | — | — | 20 |
| silane coupling agent*10 | — | 0.8 | 1.6 | 2.4 | 3.2 | 4 | — | — | — | — | — | — | — | 1.6 |
| newspaper (1)*11 | — | — | — | — | — | — | 0.5 | 1 | 3 | 5 | 10 | 12 | 15 | 15 |
| newspaper (2)*12 | — | — | — | — | — | — | — | — | — | — | — | — | — | — |
| process oil*13 | 5 | 4 | 3 | 2 | 1 | — | 5 | 5 | 5 | 5 | 5 | 5 | 5 | 3 |
| hardness index | 100 | 100 | 101 | 100 | 101 | 100 | 100 | 101 | 102 | 103 | 104 | 106 | 106 | 110 |
| abrasion resistance | 100 | 99 | 98 | 99 | 98 | 99 | 99 | 98 | 96 | 96 | 90 | 89 | 79 | 77 |
| actual driving performance | | | | | | | | | | | | | | |
| cornering | 100 | 102 | 104 | 106 | 109 | 114 | 100 | 101 | 101 | 102 | 102 | 102 | 103 | 108 |
| braking | 100 | 101 | 102 | 102 | 103 | 103 | 101 | 103 | 107 | 110 | 112 | 115 | 115 | 121 |

*CE: Comparative Example

TABLE 5

| | Example | | | | | | | | | | | |
|---|---|---|---|---|---|---|---|---|---|---|---|---|
| (PHR) | 19 | 20 | 21 | 22 | 23 | 24 | 25 | 26 | 27 | 28 | 29 | 30 |
| carbon black*8 | 30 | 30 | 30 | 30 | 30 | 30 | 45 | 40 | 20 | 10 | — | 30 |
| silica*9 | 20 | 20 | 20 | 20 | 20 | 20 | 5 | 10 | 30 | 40 | 50 | 20 |
| silane coupling agent*10 | 1.6 | 1.6 | 1.6 | 1.6 | 1.6 | 1.6 | 0.4 | 0.8 | 2.4 | 3.2 | 4 | 1.6 |
| newspaper (1)*11 | 1 | 3 | 5 | 10 | 12 | — | 5 | 5 | 5 | 5 | 5 | 0.5 |
| newspaper (2)*12 | — | — | — | — | — | 5 | — | — | — | — | — | — |
| process oil*13 | 3 | 3 | 3 | 3 | 3 | 3 | 4.5 | 4 | 2 | 1 | — | 3 |
| hardness index | 102 | 103 | 105 | 107 | 109 | 104 | 103 | 104 | 103 | 104 | 105 | 100 |

TABLE 5-continued

| (PHR) | Example | | | | | | | | | | | |
|---|---|---|---|---|---|---|---|---|---|---|---|---|
| | 19 | 20 | 21 | 22 | 23 | 24 | 25 | 26 | 27 | 28 | 29 | 30 |
| abrasion resistance | 97 | 94 | 94 | 90 | 87 | 93 | 98 | 96 | 93 | 94 | 94 | 97 |
| actual driving performance | | | | | | | | | | | | |
| cornering | 105 | 106 | 106 | 107 | 107 | 105 | 104 | 105 | 108 | 112 | 117 | 105 |
| braking | 105 | 110 | 114 | 117 | 120 | 113 | 111 | 112 | 113 | 114 | 115 | 102 |

Details of the compounding ingredients shown in Table 4 and Table 5 are as follows.

※8) carbon black: Diablack I (N220) from Mitsubishi Chemical Corporation, with specific surface area by nitrogen adsorption of 115 m$^2$/g, DBP absorption of 114 ml/100 g and iodine adsorption value of 118 m$^2$/g ※9) silica: Ultrasil VN3 from Degussa AG, with specific surface area by nitrogen adsorption (BET method) of 172 m$^2$/g ※10) silane coupling agent: Si69 (bis(3-triethoxysilylpropyl) tetrasulfide) from Degussa AG ※11) newspaper (1): common old newspaper used by being cut by means of Shredder MC 12 manufactured by Fuji Xerox into pieces of approximately 3 mm in width and 45 mm in length ※12) newspaper (2): non-cut newspaper ※13) process oil: Diana Process AH40 from Idemitsu Kosan Co., Ltd.

Ingredients as shown in Tables 3, 4 and 5 except for sulfur and vulcanization accelerator were blended and thereafter kneaded in a Banbury mixer at about 150° C. for 5 minutes. The sulfur and vulcanization accelerator were added to the resultant rubber composition, and it was further kneaded in a twin-screw open roll at about 80° C. for 5 minutes.

(3) Evaluation of Physical Properties

Hardness (Shore A) and abrasion resistance were measured by the methods as described above and actual driving performance was tested by the following method.

<Actual Driving Performance (cornering, braking)>

The rubber compositions of Examples and Comparative Examples were used to form tread sheets of 3 mm each to manufacture pneumatic radial tires for passenger cars of a basic structure as shown in FIG. 1 (tire size 185/70 R14). The tires were attached to a front-wheel drive car of 2000 cc driven under the following conditions. The test was conducted on a test course in Nayoro, Hokkaido at temperatures from −1 to −6° C. for on-icy-road performance and from −2 to −10° C. for on-snowy road performance.

(a) Cornering Performance (running time on snowy road)

The time was measured that was taken to run through a course (snowy road) in the shape of numerical character "8" having the total length of several hundred meters. The time is indicated by means of indices with the index of Comparative Example 1 defined as 100. A greater numerical value of the index means that a higher cornering performance is achieved.

(b) Braking Performance (stopping distance on icy road)

The stopping distance was measured that was required to stop the car on an icy road by applying the lock brake at the speed of 30 km/h. The distance is indicated by means of indices with the index of Comparative Example defined as 100. A greater numerical value of the index means a higher braking performance is achieved.

(4) Results of Evaluation

The rubber compositions of Comparative Examples 5 to 10 include no paper and are excellent in abrasion resistance while they are inferior in cornering and braking performances. The rubber compositions of Examples 11 to 16 include carbon black and used paper blended therein and the balance between the cornering performance and braking performance of them are not necessarily well-balanced. The rubber compositions of Comparative Examples 11 and 12 include silica, carbon black and used paper blended therein. The amount of used paper in the rubber compositions of these comparative examples is greater than 12 parts by weight and accordingly the rubber compositions exhibit a slightly deteriorated abrasion resistance.

The rubber compositions of Examples 19 to 30 include predetermined amounts of silica, carbon black and used paper that are comprehensively excellent in abrasion resistance, cornering performance and braking performance. It can be seen that the rubber composition of Example 29 including no carbon black has improved cornering and braking performances without deterioration in abrasion resistance. The rubber composition of Example 24 containing non-cut used paper exhibits its performance similar to those of other rubber compositions including cut used papers. The rubber composition of Example 30 containing silica, carbon black and used paper blended therein, with the amount of compounded used paper being 0.5 parts by weight, has improved cornering and braking performances.

EXAMPLES 31–50 AND COMPARATIVE EXAMPLE 13

(1) Basic Composition of Rubber

A rubber composition having the basic composition as shown in Table 6 was used.

TABLE 6

| compounding ingredient | PHR |
|---|---|
| NR natural rubber ※1) | 60 |
| BR (polybutadiene rubber) ※2) | 40 |
| antioxidant ※3) | 2.0 |
| wax ※4) | 1.0 |
| stearic acid ※5) | 2.0 |
| zinc oxide ※6) | 3.0 |
| sulfur ※7) | 1.0 |
| vulcanization accelerator ※8) | 1.5 |
| carbon black ※9) | varied |
| silica ※10) | varied |
| silane coupling agent ※11) | varied |
| newspaper waste ※12) | varied |
| process oil ※13) | varied |
| glass fiber | varied |
| powder product | varied |

Details of rubber components and compounding ingredients are as follows.

※1) natural rubber: RSS#3 (made in Thailand)
※2) polybutadiene rubber (BR): BR 150B from Ube Industries, Ltd.
※3) antioxidant: Noclak 6C from Ouchishiko Chemical Industrial Co., Ltd.
※4) wax: Sunnoc N from Ouchishinko Chemical Industrial Co., Ltd.
※5) stearic acid: Kiri from NOF Corporation
※6) zinc oxide: two types of zinc oxide materials from Mitsui Mining and Smelting Co., Ltd.
※7) sulfur: sulfur from Tsurumi Chemical Industry Co., Ltd.
※8) vulcanization accelerator: Nocceler NS (N-ter-butyl-2-benzothiazolylsulfenamide from Ouchishinko Chemical Industrial Co., Ltd.
※9) carbon black: Sho Black from Showa Cabot K.K.
※10) silica: Ultrasil VN3 from Degussa AG, with specific surface area by nitrogen adsorption (BET method) of 172 m²/g
※11) silane coupling agent: Si69 (bis(3-triethoxysilylpropyl) tetrasulfide) from Degussa AG
※12) newspaper waste: common old newspaper used by being cut by means of Shredder MC 12 manufactured by Fuji Xerox into pieces of approximately 3 mm in width and 45 mm in length
※13) process oil: Diana Process PA32 from Idemitsu Kosan Co., Ltd.

(2) Preparation of Rubber Composition

According to the basic composition mentioned above, rubber compositions were prepared with the amounts of glass fiber, powder product, silica, silane coupling agent, carbon black and process oil varied respectively for Examples 31 to 50 as shown in Table 7.

※14) glass fiber A: manufactured by Nippon Sheet Glass Co., Ltd. (diameter 10 μm, length 0.4 mm)
※15) glass fiber B: manufactured by Nippon Sheet Glass Co., Ltd. (diameter 50 μm, length 2.0 mm)
※16) glass fiber C: manufactured by Nippon Sheet Glass Co., Ltd. (diameter 4 μm, length 0.15 mm)
※17) glass fiber D: manufactured by Nippon Sheet Glass Co., Ltd. (diameter 120 μm, length 5.2 mm)
※18) powder product A containing cellulose material: rice chaff, Seronfiber A TYPE manufactured by Saronfiller Co., Ltd. (average grain size 100–120 μm)
※19) powder product B containing cellulose material: rice chaff, Seronfiber A TYPE manufactured by Saronfiller Co., Ltd. (average grain size 400–600 μm)
※20) powder product C containing cellulose material: rice chaff, Seronfiber A TYPE manufactured by Saronfiller Co., Ltd. (average grain size 40–60 μm)

Ingredients as shown in Table 6 except for sulfur and vulcanization accelerator were blended and thereafter kneaded in a Banbury mixer at about 150° C. for 5 minutes. The sulfur and vulcanization accelerator were added to the resultant rubber composition, and it was further kneaded in a twin-screw open roll at about 80° C. for 5 minutes. Press cure was performed on the rubber composition at 150° C. for 45 minutes to obtain vulcanized rubber. By means of a usual method, the rubber composition was used to manufacture a studless tire for truck and bus having the rubber composition in its tread.

(3) Evaluation of Performance

The following methods were used to evaluate the performance of studless tires for truck and bus.

<Braking Performance on Icy Road>

Tires were attached to the front wheels of a 10-ton truck and the stopping distance was measured that was required to stop the car on an icy road running at the speed of 30 km/h. The distance is indicated by means of indices (ice skid

TABLE 7

| | Example | | | | | | | | | | | | | | | | | | | | CE* |
|---|---|---|---|---|---|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 | 46 | 47 | 48 | 49 | 50 | 13 |
| glass fiber A*14 | 6 | — | — | — | — | — | — | — | — | — | — | — | — | — | — | — | — | — | — | — | — |
| glass fiber B*15 | — | 6 | 13 | 2 | 6 | 6 | 6 | 6 | 6 | 6 | 6 | — | — | 6 | 6 | 17 | 6 | — | 6 | 6 | — |
| glass fiber C*16 | — | — | — | — | — | — | — | — | — | — | — | 6 | — | — | — | — | — | — | — | — | — |
| glass fiber D*17 | — | — | — | — | — | — | — | — | — | — | — | — | 6 | — | — | — | — | — | — | — | — |
| powder product A*18 | 8 | 8 | 8 | 8 | — | — | — | 13 | 18 | 8 | 3 | 8 | 8 | 8 | 8 | 8 | 8 | 8 | 8 | 8 | — |
| powder product B*19 | — | — | — | — | 8 | — | — | — | — | — | — | — | — | — | — | — | — | — | — | — | — |
| powder product C*20 | — | — | — | — | — | 8 | — | — | — | — | — | — | — | — | — | — | — | — | — | — | — |
| newspaper waste*12) | 3 | 3 | 3 | 3 | 3 | 3 | 3 | 3 | 3 | 3 | 3 | 3 | 3 | 1 | 6 | 3 | 3 | 3 | 3 | 8 | — |
| carbon black*9 | 40 | 40 | 40 | 40 | 40 | 40 | 40 | 40 | 40 | 28 | 40 | 40 | 40 | 40 | 40 | 40 | 15 | 40 | 50 | 40 | 50 |
| silica*10 | 10 | 10 | 10 | 10 | 10 | 10 | 10 | 10 | 10 | 25 | 10 | 10 | 10 | 10 | 10 | 10 | 35 | 10 | — | 10 | — |
| silane coupling agent*11 | 1.0 | 1.0 | 1.0 | 1.0 | 1.0 | 1.0 | 1.0 | 1.0 | 1.0 | 2.5 | 1.0 | 1.0 | 1.0 | 1.0 | 1.0 | 1.0 | 3.5 | 1.0 | — | 1.0 | — |
| process oil*13 | 2.5 | 2.5 | 5.0 | 1.5 | 2.5 | 2.5 | 1.0 | 3.5 | 4.0 | 3.5 | 2.0 | 2.5 | 2.5 | 2.5 | 2.5 | 6.0 | 2.5 | 1.0 | 1.0 | 2.5 | — |
| braking on ice | 127 | 132 | 128 | 124 | 120 | 119 | 116 | 121 | 107 | 117 | 125 | 112 | 115 | 132 | 129 | 110 | 106 | 110 | 115 | 119 | 100 |
| steering performance on ice/snow | 127 | 132 | 127 | 124 | 120 | 118 | 115 | 122 | 109 | 117 | 125 | 112 | 117 | 132 | 129 | 112 | 109 | 109 | 115 | 117 | 100 |
| abrasion resistance | 89 | 88 | 86 | 93 | 90 | 83 | 94 | 84 | 74 | 82 | 92 | 90 | 81 | 90 | 83 | 76 | 77 | 94 | 91 | 76 | 100 |

*CE: Comparative Example index) represented by the following equation with the index of the stopping distance of Comparative Example 13 defined as 100. A greater index means a higher on-ice braking performance is achieved.

(ice skid index)=(stopping distance of Comparative Example 13)÷(stopping distance of each rubber composition)×100

<Steering Performance on Icy and Snowy Road>

Tires were attached to the front wheels of a 10-ton truck and the time was measured taken to run on an icy and snowy road of a course in the shape of numerical character "8" having the total length of several hundred meters. The performance was evaluated by means of indices (ice grip index) represented by the following equation with the index of time for Comparative Example 13 defined as 100. A greater index means a higher steering performance is achieved.

(ice grip index)=(running time of Comparative Example 13)÷(running time of each rubber composition)×100

<Abrasion Resistance>

A Lambourn abrasion tester was used to measure an amount of abrasion of vulcanized rubber under the conditions that the temperature was 20° C., the slip ratio was 25% and test time was 3 minutes to calculate volume loss for each rubber composition. The abrasion resistance is indicated by means of indices (Lambourn abrasion index) represented by the following equation with the volume loss for Comparative Example 13 defined as 100. A greater index means a superior abrasion resistance is achieved.

(Lambourn abrasion index)=(volume loss of Comparative Example 13)÷(volume loss of each rubber composition)×100

(4) Results of Evaluation

Table 7 shows results of the evaluation described above.

Examples 31 to 45 in which glass fibers, old newspapers and silica are blended therein by specific amounts respectively provide an excellent on-icy/snowy-road performance.

It can be understood from comparison of results between Examples 50, 32, 44 and 45 that if the amount of old newspaper is too large, the effect of enhancing the on-icy/snowy-road performance is small.

Comparison of results between Examples 46, 48 and 32–34 shows that if glass fibers are compounded by too large or too small amount, merely a small effect of enhancing the on-icy-road performance is accomplished.

Further, comparison of results between Examples 47, 49, 32 and 40 shows that if silica is compounded by too large or too small amount, merely a small effect of enhancing the on-icy/snowy-road performance is accomplished.

It can be seen from comparison of results between Examples 32, 37–39 and 41 that the on-icy/snowy road performance is further enhanced by compounding powder product containing a specific amount of cellulose material.

The results described above clearly show that the rubber composition of the present invention can dramatically improve the ice grip performance by including short fiber, paper and silica compounded therein by specific amounts respectively when the composition is used in a tread for a studless tire or the like. In addition, since used paper or paper waste is compounded, a remarkable cost-down is possible while the ice grip performance and abrasion resistance are maintained.

According to the present invention, a rubber composition for tire can be provided that effectively utilizes paper as waste without deterioration in various physical properties such as hardness and abrasion resistance. Accordingly, the cost for manufacturing tires can considerably be decreased while the tires are reinforced in view of resource saving and environmental protection. Moreover, when the rubber composition of the present invention is used in a tread portion of a tire, abrasion resistance as well as cornering and braking performances can remarkably be enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rubber composition for a tire tread comprising from 0.5 to 12 parts by weight of paper, from 5 to 100 parts by weight of silica, from 2 to 15 parts by weight of short fiber and from 3 to 15 parts by weight of a powder product containing a cellulose material relative to 100 parts by weight of a rubber component, said paper being cut into pieces having a width of 5 mm or less and said silica having a specific surface area by nitrogen adsorption (BET) of 50 to 350 m$^2$/g.

2. The rubber composition according to claim 1, wherein said paper is newspaper waste.

3. The rubber composition according to claim 1, further comprising from 10 to 100 parts by weight of carbon black relative to 100 parts by weight of the rubber component, said carbon black having a specific surface area by nitrogen adsorption (BET method) of from 40 to 160 m$^2$/g, a DBP adsorption of from 70 to 130 ml/100 g and an iodine adsorption value of 70 to 130 mg/g.

4. The rubber composition for a tire tread according to claim 1, further comprising a silane coupling agent.

5. A pneumatic tire comprising the rubber composition for a tire tread according to claim 1 also disposed in a bead apex.

6. The rubber composition for a tire tread according to claim 1 wherein the paper is processed via a muddy state of low concentration containing 3% or less of a solid component.

* * * * *